No. 738,041. PATENTED SEPT. 1, 1903.
F. W. KEY.
COTTON PLANTER.
APPLICATION FILED JULY 6, 1903.
NO MODEL.
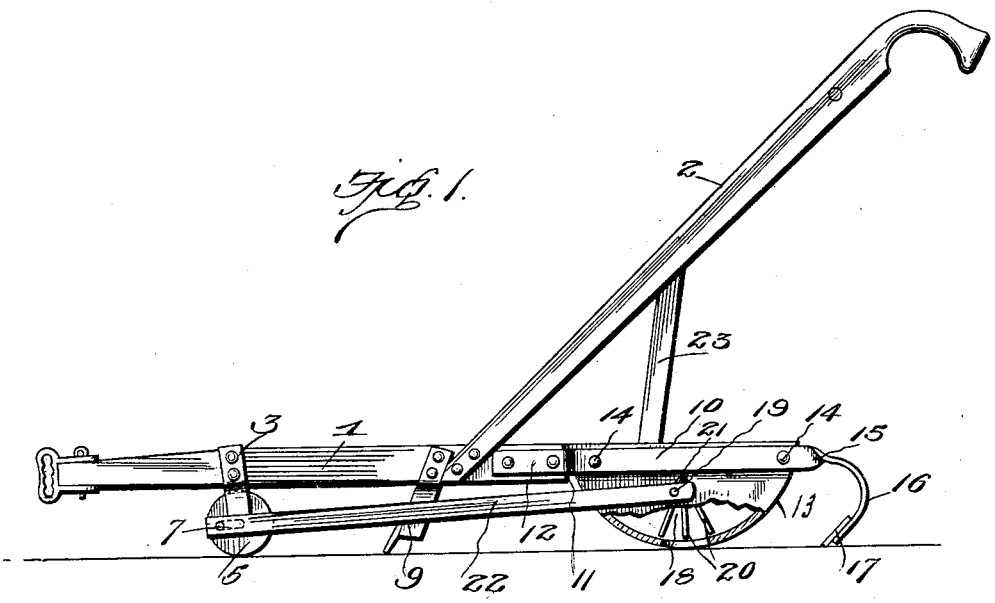
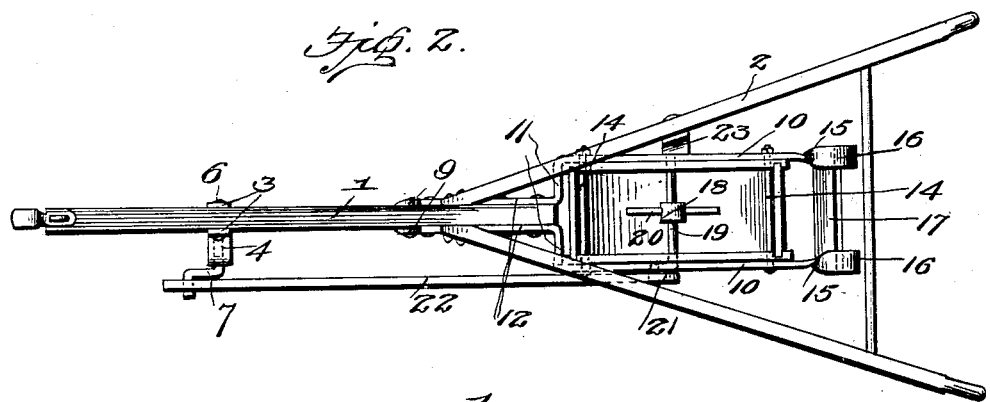
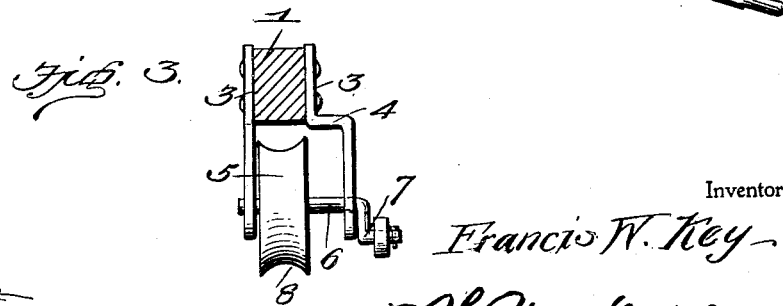
Witnesses
Inventor
Francis W. Key
By H. B. Wilson
Attorney
THE NORRIS PETERS CO., PHOTO-LITHO., WASHINGTON, D. C.

No. 738,041. Patented September 1, 1903.

UNITED STATES PATENT OFFICE.

FRANCIS WESLEY KEY, OF STAUNTON, GEORGIA.

COTTON-PLANTER.

SPECIFICATION forming part of Letters Patent No. 738,041, dated September 1, 1903.

Application filed July 6, 1903. Serial No. 164,423. (No model.)

*To all whom it may concern:*

Be it known that I, FRANCIS WESLEY KEY, a citizen of the United States, residing at Staunton, in the county of Berrien and State of Georgia, have invented certain new and useful Improvements in Cotton-Planters; and I do declare the following to be a full, clear, and exact description of the invention, such as will enable others skilled in the art to which it appertains to make and use the same.

My invention is an improved cotton-planter adapted to be used as an attachment to an ordinary plow-stock and which is exceedingly light, simple, cheap, may be readily kept in place on the cotton beds or ridges, and is very easily arranged and operated; and it consists in the construction and combination of devices hereinafter described and claimed.

In the accompanying drawings, Figure 1 is a side elevation of a cotton-planter embodying my improvements with the hopper partly in section. Fig. 2 is a top plan view of the same. Fig. 3 is a detail sectional view of the same.

The beam 1 and handles 2 are of the construction which is usual in ordinary plow-stocks, the handles being attached at their lower ends to the beam at some distance from the rear end of the latter. A pair of standard-bars 3 have their upper ends bolted to opposite sides of the beam 1 at a suitable distance from the front end thereof. One of the said standard-bars is straight. The other has a lateral offset 4 near its upper end, whereby the space between it and the other standard-bar is widened. Between the lower portions of the said standard-bars is mounted a ridge-roller 5, its axle-shaft 6 being journaled in bearings with which the said standard-bars are provided and being formed or provided with a crank 7 at one end. The said ridge-roller has a concave tread, as at 8, which adapts it to hug the crest of the cotton ridge or bed and adapt the planter to be readily retained thereon. At a suitable distance in rear of the standard 3 is a furrow-opener 9, which is adapted to open a furrow in the crest of the ridge for the reception of the cotton-seed.

A pair of horizontal longitudinally-disposed arms 10, which are made of iron or steel, are provided at a suitable distance from their front ends with lateral bends 11, and their front portions 12 are bolted to opposite sides of the beam at the rear end thereof. The provision of the lateral bends 11 causes the said arms 10 to be appropriately spaced apart to receive a semicylindrical hopper 13 between them, the said hopper being secured thereto by means of bolt-rods 14, as shown. The rear portions of the arms 10 in rear of the hopper are quarter-turned or twisted, as at 15, and then downturned and curved, as at 16, the said downwardly-extending curved portion 16 of the said arms forming standards which carry a covering-board 17, the latter being disposed on the front sides of the said standards and bolted or otherwise suitably secured thereto. The bottom of the hopper is provided with an opening of suitable size and shape to facilitate the dropping of the cotton-seeds therefrom, and in the hopper is an oscillating seed-stirrer 18, which comprises a shaft 19, having its bearings in the sides of the hopper, and stirring-fingers 20, which radiate from the said shaft. At one end of the latter is a crank 21. A pitman 22 has its ends connected to the cranks 7 21, and it will be understood that when the planter is in operation oscillating motion will be imparted to the stirring device in the hopper, so that the seeds will be caused to be dropped from the hopper into the furrow on the ridge. The seeds are covered by the covering-board 17. A brace-bar 23 has its lower end attached to one of the arms 10 and its upper end attached to one of the handles 2 to brace the latter and to also afford a firm connection between the handles and the arms 10, which carry the hopper.

A cotton-planter thus constructed is exceedingly light, cheap, and simple, is very easily drawn by one horse, may be readily guided and controlled by the operator, and may be easily lifted over stumps, stones, and other obstructions and turned at the ends of the rows.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

A planter comprising a beam, a furrow-opener and handles attached thereto, a hopper in rear of the beam, under the handles, arms 10 having their intermediate portions secured to opposite sides of the hopper, their front portions bent inwardly and forwardly and secured to opposite sides of the beam, and their rear portions turned downwardly in rear of the hopper, a covering device attached to and connecting said downturned portions of said arms, a brace-bar connecting one of the arms and one of the handles, an oscillating stirrer in the hopper and having a crank, a roller carried by the beam, in advance of the furrow-opener and having a crank, and a pitman 22 connecting said cranks, substantially as described.

In testimony whereof I have hereunto set my hand in presence of two subscribing witnesses.

FRANCIS WESLEY KEY.

Witnesses:
W. L. MORROW,
J. J. MURRAY.